Dec. 30, 1969   M. ARONSON   3,486,242
ASSAULT BOAT COXSWAIN TRAINER
Filed May 29, 1967   2 Sheets-Sheet 2
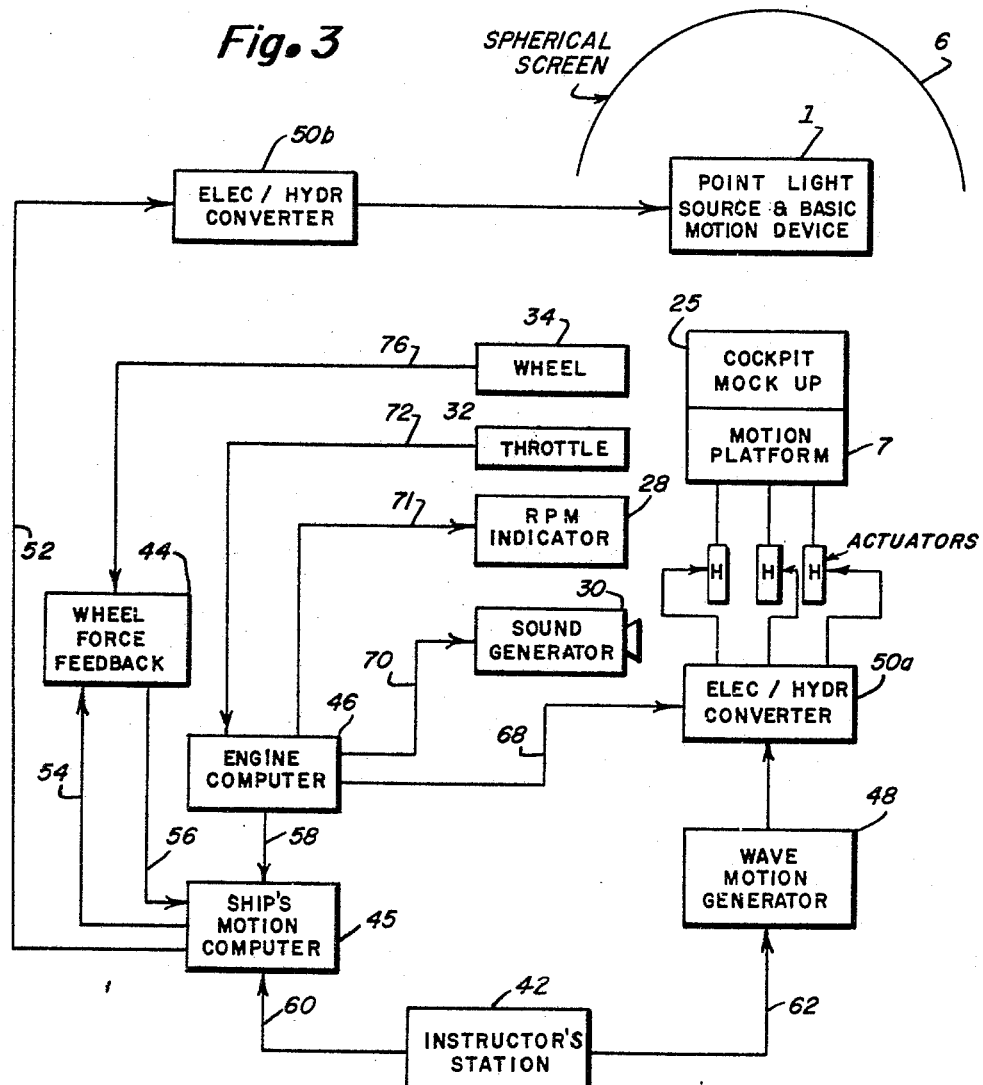
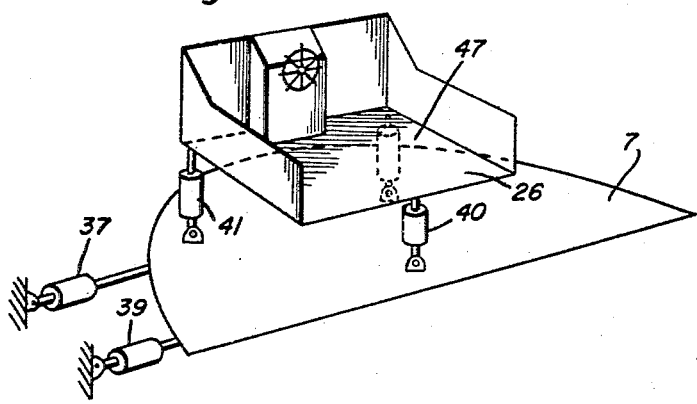
INVENTOR.
Moses Aronson
BY
John F. Miller, Agent
John W. Pease, Attorney United States Patent Office 3,486,242
Patented Dec. 30, 1969

3,486,242
ASSAULT BOAT COXSWAIN TRAINER
Moses Aronson, Massapequa, N.Y., assignor to the United States of America as represented by the Secretary of the Navy
Filed May 29, 1967, Ser. No. 643,306
Int. Cl. C09b 9/06, 19/16
U.S. Cl. 35—11                                    1 Claim

ABSTRACT OF THE DISCLOSURE

A simulator system for duplicating the appearance, movements, sounds, and "feel" of the control station of a boat or other craft or vehicle for training coxswains or steermen. The control station responds with movement, sounds, etc., to operation of controls located at the station and at an instructor's station.

CROSS REFERENCE TO RELATED APPLICATION

Copending application Ser. No. 471,814 filed July 14, 1965, by Louis P. Raitiere, now Patent No. 3,356,002, is referred to hereinafter.

BACKGROUND OF THE INVENTION

This invention is in the field of simulation. In the prior art various devices for simulating the coxswain's or driver's station in a movable craft or vehicle have been built embodying controls and displays responsive thereto. However prior art devices have been lacking in realism. Some simulators have been built which furnish limited signals to a coxswain trainee but heretofore no simulator has been available which furnished visual, aural, and tactile signals of the quality necessary for complete realism.

SUMMARY OF THE INVENTION

A simulated coxswain's station including all the controls and instruments peculiar to a particular boat, craft, or vehicle. By providing means for simulating all the visual, aural, and tactile signals sensed by a coxswain or steersman in a landing or docking operation one object of the invention, that of avoiding the lack of realism affecting prior art simulators, is attained. The station responds with movements, sounds, etc., to operation of the controls located there and at an instructor's station. Thus the object of making effective training of coxswains possible without risk of injury to personnel or equipment and independently of weather and location is attained.

BRIEF DESCRIPTION OF THE DRAWING

FIG. 2 shows some mounting details of deck-platform 26 of FIG. 1.

FIG. 3 shows an embodiment of the invention using a point light source display.

DESCRIPTION OF THE PREFERRED EMBODIMENT

Figure 1:
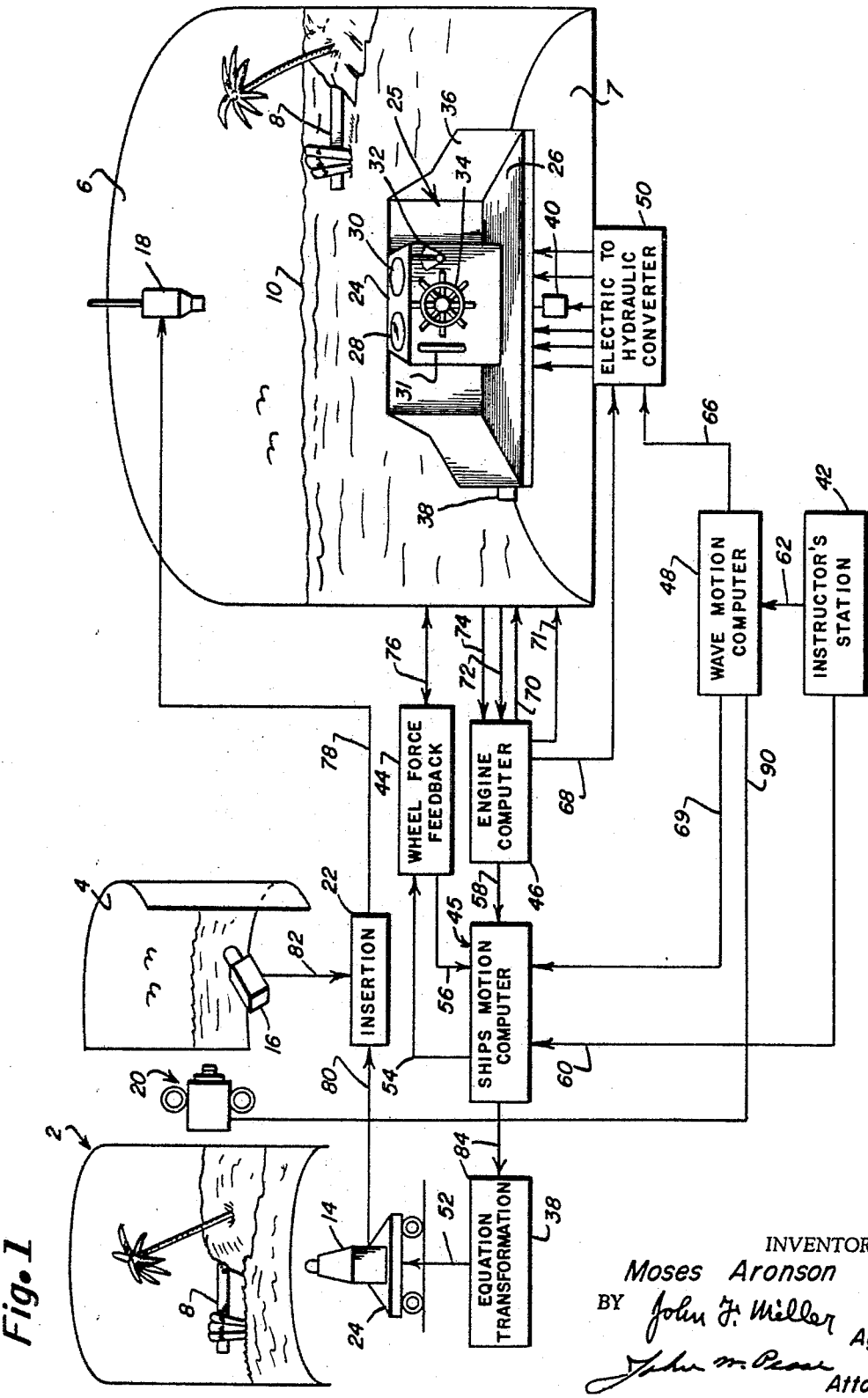
FIG. 1 is a combined pictorial-schematic showing of one form of the invention.

The embodiment of the invention shown in FIG. 1 comprises a cockpit mockup 25 of, for example, an assault boat, positioned within the curvature of a hemispherical screen 6. Only a part of screen 6 is shown. A TV projector 18 projects a picture on screen 6 comprising a dock and/or beach 8 and a seascape 10 showing moving waves, sea birds, etc., typical of a marine environment which changes with apparent changes of position of cockpit mockup 25. Cockpit mockup 25 is comprised of a deck platform section 26 to which is fixed a vertical side and front sections 26 simulating the cockpit or coxswain's steering station of an assault boat or other craft. The drawing does not necessarily resemble an actual boat but is modified to best illustrate all the features of the invention. A console 24 has fixed thereto such instruments as required to simulate the controls and indicators of a particular craft, in this example a tachometer 28, a speaker 30 for producing engine and/or other sounds, a reverse lever 31, a throttle 32, and a steering wheel 34. In operation a trainee stands in the cockpit and operates the controls to practice dockings and/or landings. Platform 26 is flexibly mounted by means not shown so that it is movable in any direction in a complex pattern simulating the actual movement patterns of a boat in a sea typified by wave, wind, tide and current forces of selected magnitudes, velocities, and directions. Platform mounting means may be any of the expedients well known in the art, e.g. ball joints, springs, gimbals etc. Platform 26 is moved by actuators of which 38 and 40 shown fixed to platform 26 are exemplary. 38 and 40 may be fixed at opposite ends to platform 26 and to a stationary base 7 by flexible connections such as ball joints, universals, etc. (not shown), in a manner well known in the art. Additional actuators not shown are fixed in a manner similar to 38 and 40 to give platform 26 a movement including roll, pitch, heave, and any desired lateral motion commensurate with the simulated wind, current, and wave pattern selected. Alternatively, platform motion may be limited to roll, pitch, and heave, and lateral motion simulated visually by movement of a TV camera 14 only in a manner explained hereinafter. An additional movement is superimposed on platform 26 by appropriate actuators to simulate the movement caused by engine vibration. Thus a student trainee standing at the coxswain's station can operate the controls and experience all the visual, aural, and tactile sensations which are experienced in a real boat in an actual docking or landing situation, and thereby acquire the necessary dexterity and skills without risk of life, injury, or damage to boat, docks, etc. Cockpit 25 is positioned within the hemispherical screen 6 and the scene viewed by the trainee changes as the controls are operated. From the trainee's viewpoint the boat appears to approach or move away from the dock or beach in obedience to wheel, throttle, and reverse controls.

The scene viewed by the trainee projected by TV projector 18 on screen 6 originates at a pair of TV cameras 14 and 16. Cameras 14 and 16 are connected to an insertion device 22 by lines 80 and 82 respectively. Insertion device 22 is connected to projector 18 by a line 78. Camera 14 views a dock and/or beach scene 8 which may be a three dimensional model 2, a painting, projection, or other replica. The seascape 10 is projected on a screen 4. The seascape 10 may be created by any known expedient, for example by a moving picture projector 20 projecting a picture of live wave action, birds, etc. The information from camera 16 is inserted in the information from camera 14 by an insertion device 22. This results in the composite view projected by 18 on screen 6.

Camera 14 is mounted on a carriage 24 shown in FIG. 1 symbolically as a wheeled cart. 24 is a powered carriage known in the television art as a "crab" and movable in any direction in response to signals from equation transformation element 38. In addition to the horizontal motion of carriage 24 means can be provided for elevating, tilting, and angling camera 14 using additional signals or these functions can be performed as hand operations. Camera 14 moves towards or away from and/or parallel to dock beach 8 in a horizontal plane in response to instructions from equation transformation 38 over line 52. The movement of camera 14 affects the picture on screen 6, for example when camera 14 approaches dock 8 the cockpit 25 appears to a trainee to approach dock 8. Input signals to equation transformation 38 are received over the line 84 from a ship's motion computer 45. A connection 56, 76, between wheel 34 and ship's motion computer 45 feeds wheel position information to the computer through a wheel force feedback unit 44. Information fed back from ship's motion computer 45 over line 54 to unit 44 causes 44 to feedback a force proportional to rudder position of direction of ship's motion to wheel 34 over line 76 to give a realistic action or "feel" to the wheel which enhances the realism and training effect. Lines such as 76 are shown terminating at the edge of screen 6 to avoid complication of the drawing. Computer 45 receives propellor thrust information over line 58 from an engine computer 46 and a wind information input over line 60 from an instructor's station 42. Other information such as current direction and force or velocity, tides etc. may be furnished to computer 45 from station 42 if desired. Engine computer 46 receives an input from throttle control 32 over line 74 and from reverse lever 31 over line 72. Engine computer 46 feeds back engine speed information over line 71 to tachometer 28, engine sound information over line 70 to loudspeaker 30, and engine vibration information over line 68 to a converter 50. Therefore as a trainee opens throttle 31 a proportionately higher r.p.m. will be indicated on tachometer 28, the frequency of engine sounds from loudspeaker 30 will increase, the force felt on wheel 34 may increase depending on its rotary position, and the frequency of engine vibration felt through deck platform 26 will increase. The prop thrust output from engine computer 46 over line 58 to ship's motion computer 45 will increase and therefore the output of 45 on line 84 to equation transformation 38 will produce an output from 38 on line 52 to cause carriage 24 to approach or back away from dock-beach model 8 at a rate compatible with the increased throttle opening. Other controls are not shown to avoid complication of the drawing. Instructor's station 42 furnishes control signals over line 62 to a wave motion computer 48 which in response thereto forwards control signals over line 66 to converter 50 which in turn causes transducers such as 40 to produce a motion of deck-platform 26 simulating the effects of wave action on a boat. Computer 48 also furnishes control signals over line 69 to ship's motion computer 45. The wave action is regulated in accordance with the instructor's signals from station 42. Projector 20 is controlled from wave motion computer 48 over a line 90. The invention contemplates overriding connections from instructor's station 42 to all controls, instruments, and other elements, enabling the instructor to simulate emergency conditions such as the failure of engines, steering gear, control elements, etc., if desired.

While the drawing has been simplified, the invention contemplates the simulation of more sophisticated craft, e.g., multi-engined, multiple throttle craft, with complex instrumentation, landing gear, propulsion systems, etc. The computer for more complex installations would be programmed for additional inputs and outputs.

FIG. 2 shows in more detail one possible arrangement for actuating deck platform 26 in accordance with the control signals received at converter 50 from engine computer 46, wave motion computer 48, and instructor's station 42. Deck platform 26 is flexibly mounted by suitable means not shown, for example on springs or equivalent flexible mounting means, or may be suspended on actuator means such as 40, 41, and 47. The actuator means are shown as the well known hydraulic or pneumatic cylinder and plunger arrangement but may be any suitable actuator. These actuators may be fastened to deck platform 26 by a ball joint on the plunger and fastened to member 7 by a ball joint on the closed end of the cylinder. Actuators 40, 41 and 47 acting in unison in response to signals from converter means 50 may impart pitch movement to deck platform 26, actuators 41 and 47 may impart roll, actuators 40, 41, and 47, acting in unison may impart motion to 26 simulating heave and engine vibration, actuators 37 and 39 may impart various lateral motions associated with vibration and wave action and all the actuators may act together in response to complex signals originating at wave motion computer 48, engine computer 46 and instructor's station 42 to simulate the most complex motions experienced by a boat under real life conditions of waves, currents, surf, winds, and tides, as modified by engine, rudder, and propellor action.

A modification of the simulator of FIG. 1 which is suitable for "open sea" type problems such as refueling and other maneuvers is shown in FIG. 3. Here a point light source and basic motion device 1 is arranged to direct light through a transparency not shown to produce a seascape on a screen 6. The basic motion device is actuated by electric to hydraulic converters to cause relative motion between the point light source and the transparency in accordance with instructions from a ship's motion computer 45 to shift the view on screen 6 in a manner analogous to the apparatus of FIG. 1. A coxswain trainee standing in a cockpit 25 sees the view on screen 6 shift in response to operation of cockpit controls such as throttle 32 and wheel 34 and to signals from an instructor's station 42 in a manner similar to that described in the foregoing explanation of FIG. 1.

The apparatus of FIG. 3 is similar to that of FIG. 1 except for the above described differences and operates in a similar manner. Some elements, e.g., throttle 32 and wheel 34 shown pictorially in FIG. 1 are shown as blocks in FIG. 3 but the elements and organization are similar. Like elements and connections are identified with the same numerals in FIGS. 1 and 3 so that except for the above noted differences the explanation of FIG. 1 is applicable to FIG. 3. The simpler display system of FIG. 3 is satisfactory for open sea training problems which do not involve docking or beaching.

Computers 45, 46, 48, and equation transformation element 38 may be sections of a single computer. In the prototype apparatus an analog computer has been used, the Reac 550, built by Reeves Instrument Co. The Reac 550 is a 200 amplifier system containing 24 multiplier and resolver servos and a full complement of non-linear high speed electronic computing components which perform the basic arithmetic operations and a wide variety of logical decision making operations. A smaller special purpose computer could be used. A set of motion equations including those terms accounting for desired hydrodynamic and environmental effects were derived for an assault boat. The form of the equations of motion of a body moving in a fluid is known but it is necessary to substitute a particular set of response coefficients for a particular boat. The computer is programmed to solve the motion equations for the assault boat in real time in response to the signals received from instructor's station 42 and the controls in cockpit 25. The data from these computations is reprocessed in the equation transformation element 38 of the computer and transformed to signals compatible with servo drives of carriage 24 and camera 14, since a rescaling of voltages is required. The information to the TV carriage and camera comprises the rotational speed and steering angle of each of the three wheels of the carriage and the yaw heading angle for the camera. The instructor's station 42 may be any suitable computer input device. Converter 50 may be a commercially available electro-hydraulic converter. Wheel force feedback device 44 may be a voltage responsive hydraulic pressure converter fixed to resist the turning of wheel 34. TV camera 14 and/or 16 may be a wide angle system of three lens and TV cameras such as disclosed in copending U.S. application Ser. No. 471,814 filed July 14, 1965. Motion picture projector 20 is a standard unit modified to operate at thirty frames per second without a shutter. It is synchronized with the TV camera by means well known in the art.

Various refinements and modifications will suggest themselves to those skilled in the art on reading the above disclosure. For example the total training effect might be enhanced by adding of factory signals and other more subtle stimuli to the environment. It should therefore be understood that the invention is not confined to the specific embodiment disclosed but is limited only by the following claims.

The invention described herein may be manufactured and used by or for the Government of the United States of America for governmental purposes without the payment of any royalties thereon or therefor.

What is claimed is:

1. In a simulator system, the improvement comprising:

means for simulating a marine environment including simulated dock and beach means, means for simulating a boat including a control station with control means, and means for causing said boat to appear to maneuver with respect to said dock and/or beach means responsive to said control means;

wherein said means for simulating a marine environment comprise a plurality of TV camera means for scanning reproductions of marine scenery, a TV projector means operatively associated with a screen means, means for combining the output signals of said TV camera means, and means for connecting said combining means to said TV projector means whereby said marine scenery is combined on said screen means;

wherein said means for causing said boat to appear to maneuver with respect to said dock and/or beach include computer means responsive to said control means, means for maneuvering said TV camera means, means for moving said boat means, and means operatively connecting said computer means to said camera maneuvering means and said boat moving means whereby said camera means maneuver and said boat means move in response to control signals from said computer means;

wherein said computer means comprise a ship's motion computer, an engine computer, a wave motion computer, and equation transformation means;

means connecting said motion computer and said equation transformation means, means connecting said equation transformation means and said camera means whereby said camera means maneuver in accordance with control signals from said equation transformation means, means connecting said wave motion computer to a converter means whereby said converter means are actuated in accordance with control signals from said wave motion computer, means connecting said wave motion computer to said ship's motion computer whereby the output of said wave motion computer is incorporated in the output of said ship's motion computer furnished to said equation transformation means to control the maneuvering of said camera means, means connecting said engine computer to said converter means whereby said converter means are actuated in accordance with control signals from said engine computer; and means connecting said converter means to said simulated boat whereby said boat is moved in accordance with control signals from said wave motion computer and said engine computer.

References Cited

UNITED STATES PATENTS

| | | | |
|---|---|---|---|
| 2,883,763 | 4/1959 | Schaper | 35—12 |
| 3,012,337 | 12/1961 | Spencer et al. | 35—12 |

EUGENE R. CAPOZIO, Primary Examiner

P. V. WILLIAMS, Assistant Examiner